United States Patent Office 3,459,657
Patented Aug. 5, 1969

3,459,657
PROCESS FOR THE SELECTIVE HYDROGENATION OF PYROLYSIS GASOLINE
Walter Krönig, Leverkusen, Kurt Halcour, Cologne-Stammheim, and Gerhard Scharfe, Leverkusen, Germany, assignors to Farbenfabriken Bayer Aktiengesellschaft, Leverkusen, Germany, a corporation of Germany
No Drawing. Filed May 4, 1966, Ser. No. 547,404
Claims priority, application Germany, May 12, 1965, F 46,027
Int. Cl. C10g 23/02; B01j 11/46
U.S. Cl. 208—143                         7 Claims

ABSTRACT OF THE DISCLOSURE

Improvements in the selective hydrogenation of pyrolysis gasoline or fractions thereof, which include the use of an aluminium spinel catalyst support and hydrogenation of below 100° C.

---

In connection with the selective hydrogenation of pyrolysis gasoline or fractions thereof at temperatures below 100° C. in the presence of supported noble metal catalysts on supports, it has been found that particularly good results are obtained by using supports consisting wholly or in part of aluminium spinel as the supports for the noble metal, in particular palladium. The mean pore diameter of the catalyst support is advantageously 200 to 800 A. and the intrinsic surface is 10 to 120 m.²/g. Spinel-forming metals include in particular lithium, beryllium, magnesium, zinc, manganese, copper, cobalt and nickel. The support should consist of at least 20%, and as far as possible of 40% and more, of aluminium spinel. Supports which have proved to be especially suitable are those which consist almost completely, e.g. 95 to 100%, of spinel.

The support is preferably prepared by starting with highly active aluminium oxide in lump form, this having an intrinsic surface of 200 to 350 m.²/g. This aluminium in lump form, for example as cylinders, pellets or balls, with dimensions of 2 to 10 mm., can be impregnated with a solution of a compound (salt, hydroxide) of the spinel-forming metal to be used and then dried. When salts are used for the impregnation, it is preferred to convert these into oxides by heating them to 250 to 650° C., if desired with addition of gases which contain oxygen or water vapour. Heating is then carried out to 900 to 1300° C., for example, for a period from 1 to 10 hours, in order to produce the spinel. In order to obtain a stoichiometric formation of spinel, it is possible to repeat the impregnation with the solution a number of times, with intermediate drying or decomposition of the salts. One may also start with fine-grain aluminium oxide having a large intrinsic surface and add this to a solution of the metal compound, it being possible in this case to add from the outset as much solution of the metal compound as corresponds to the proposed subsequent degree of conversion into spinel. After drying, and possible roasting, the composition can be shaped with addition of lubricants, for example, to extruded shapes or pellets and be heat-treated as described above. Furthermore, it is possible to produce mixed spinels by using several spinel-forming metal compounds. The temperature used for the heat treatment and the duration of the heating process differ with the individual spinels, but it is readily possible by preliminary tests to establish what conditions are to be maintained in order to produce the required properties of the catalyst support. More especially the particular heating temperature and the duration thereof have an influence on the internal surface and the pore diameter of the support.

The noble metal, more especially palladium, can be applied to the support in quantities of for example 0.01 to 5% by weight and advantageously 0.01 to 2% by weight, by for example impregnating the support with an aqueous palladium salt solution and by precipitating the palladium on the support by reduction, for example, with formaldehyde in alkali solution. However, the palladium in the form of a salt, for example as a nitrate, or as organic salts, for example as acetate, can be converted into the metal by reduction with hydrogen at elevated temperature.

It may also be advantageous with these catalysts for the noble metals or noble metal compounds, subsequent to the application to the support, to be treated with sulphidic agents and then with hydrogen. By way of example, the catalyst added to the noble metal salt can be treated at normal or elevated temperature with hydrogen sulphide and, after washing out the salts, be treated with hydrogen at 100 to 250° C.

Highly unsaturated gasolines, so-called cracked gasolines, which are obtained by pyrolysis of liquid hydrocarbons may be used as starting materials to be hydrogenated. These cracked gasolines are advantageously subjected to a re-distillation before they are introduced into the hydrogenation in order to remove the constituents above the boiling range of the gasoline. Preferably the re-distilled product has a gum content below 5 mg. per 100 ml. of gasoline. Since there is no increase in the gum during the hydrogenation according to the present process, the hydrogenation product does not have to be subjected to re-distillation. The materials introduced generally have bromine numbers between 50 and 80 g./100 g. and diene contents of 8 to 25% vol. Instead of the total re-distilled cracked gasoline, it is also possible to introduce fractions thereof into the hydrogenation, for example, certain aromatic fractions.

In order to remove the unstable (diolefinic) compounds, the material introduced is trickled in the liquid phase through vertical tubes over the catalyst fixedly arranged in the reaction chamber. At the same time, hydrogen is added from above. The hydrogen gas should contain at least 50% by volume and as far as possible more than 75% by volume of hydrogen. It is expedient to use hydrogen pressures between 10 and 50 atm. and advantageously 20 to 30 atm. The operation is so carried out that the temperature of the entering pyrolysis gasoline is advantageously 20 to 40° C. and the temperature of hydrogenation product leaving the reactor is in the range between 20 and 100° C., advantageously below 75° C. 10 to 20% by volume of the hydrogen required for the chemical reaction can be released from the gas phase of the separator situated beneath the reactor. The freshly introduced pyrolysis gasoline is charged for example at a rate of 2 to 6 kg. per litre catalyst and per hour. Preferably 0.2 to twice the volume of the already hydrogenated product is recycled from the separator to the top of the reactor and is admixed at this point with the freshly supplied material, the return preferably being effected without release of pressure.

Depending on the material introduced, the hydrogenation products have a bromine number of 20 to 55 g./100 g., a diene content below 1% by weight, values, of existent and potential gum lower than 5 mg./100 ml. and an induction period greater than 240 minutes. The loss in octane number with and without addition of lead, is generally less than 2 RON. Generally no desulphurisation takes place.

Example 1

The preparation of the catalyst support was carried out as follows:

Balls having a diameter of 4 mm. and consisting of active aluminium oxide with an intrinsic surface of 288 m.$^2$/g. were impregnated at normal temperature in that quantity of saturated aqueous solution of cobalt-(II) nitrate which corresponded to a 60% formation of cobalt-aluminium spinel. By heating the impregnated and dried balls to 500° C., the cobalt nitrate was converted to the oxide. This product was then heated for 8 hours at 1050° C., the formation of spinel being completed. The support thus obtained had an intrinsic surface of 40 m.$^2$/g. and the mean pore size was 760 A. In order to prepare the catalyst, the support was impregnated with palladium-(II)-chloride. The palladium was then precipitated with alkaline formaldehyde in finely divided form on the support. The palladium content of the catalyst prepared was 1% by weight.

The catalyst was introduced in a quantity of 1.3 litres into a vertically disposed tube having an internal diameter of 25 mm. and a length of 3 m., said tube being provided with a water jacket.

The hydrogenation of the pyrolysis gasoline was carried out in a hydrogen atmosphere of 30 atm. The product to be hydrogenated, which had been re-distilled beforehand and had an existent gum of 2 mg./100 ml. and to which 40 p.p.m. of inhibitor were added, was introduced at the upper end into the reactor at 25° C. at a rate of 5 kg. per litre and per hour. The liquid product trickled down in the hydrogen atmosphere over the catalyst. The exist temperature was 75° C. From the hydrogenation product accumulating in a separator beneath the reaction chamber, quantities equal to the introduction of fresh material were recycled into the reactor. From the gas chamber above the reaction product in the separator 10% of the hydrogen required for chemical reaction was released.

A comparison of the properties of the re-distilled starting material (pyrolysis gasoline) introduced and of the hydrogenation product obtained is shown in the following table:

|  | Cracked gasoline introduced | Hydrogenation product, average value from 900 operating hours |
|---|---|---|
| Density at 20° C | 0.770 | 0.765 |
| Bromine number (g./100 g.) | 65 | 35 |
| Diene content (percent by weight) | 18 | 0.8 |
| Existent gum (mg./100 ml.) | 2 | 2 |
| Potential gum (mg./100 ml.) | 1,980 | 4 |
| Induction period (minutes) | 45 | >240 |
| Color | (1) | (2) |
| Odor | (3) | (4) |
| RON unleaded | 96.2 | 95.8 |
| RON +0.04% TEL | 98.4 | 98.5 |
| Benzene (percent by weight) | 26.4 | 26.2 |
| Toluene (percent by weight) | 17.3 | 17.4 |

1 Deep yellow. 2 Colorless. 3 Unpleasant. 4 Agreeably aromatic.

Example 2

The catalyst support was prepared in the manner described in Example 1, but using magnesium nitrate instead of cobalt nitrate. The quantity of the magnesium nitrate introduced corresponded to a spinel formation of 60%. Furthermore, the noble metal catalyst was prepared in the manner described in Example 1, and the hydrogenation product accumulating in a separator beneath the results are shown in the following table:

|  | Cracked gasline introduced | Hydrogenation product, average value from 900 operating hours |
|---|---|---|
| Density at 20° C | 0.775 | 0.769 |
| Bromine number (g./100 g.) | 67 | 40 |
| Diene content (percent by weight) | 16 | 0.8 |
| Existent gum | 2 | 2 |
| Potential gum | 2,170 | 3 |
| Induction time (minutes) | 56 | >240 |
| Color | (1) | (2) |
| Odor | (3) | (4) |
| RON unleaded | 96.0 | 95.2 |
| RON +0.04% TEL | 98.3 | 98.3 |
| Benzene (percent by weight) | 25.8 | 25.7 |
| Toluene (percent by weight) | 18.6 | 18.8 |

1 Deep yellow. 2 Colorless. 3 Unpleasant. 4 Agreeably aromatic.

Example 3

(a) For the preparation of the catalyst, the balls of active aluminium referred to in Example 1 were impregnated at ordinary temperature with a solution of lithium formate, and were then dried at 150° C. The support was then heat-treated for 8 hours at 1050° C. The prepared support contained 1.1% by weight of lithium and, according to the X-ray structure, consisted of 80% of lithium-aluminium spinel and 20% of α-aluminium oxide. The intrinsic surface was 55 m.$^2$/g. and the mean pore size was 680 A.

The preparation of the noble metal catalyst and the hydrogenation reaction carried out using such catalyst took place in the manner described in Example 1.

The product introduced and hydrogenation product compare as follows:

|  | Cracked gasoline introduced | Hydrogenation product, average value from 1000 operating hours |
|---|---|---|
| Density at 20° C | 0.772 | 0.768 |
| Bromine number (g./100 g.) | 63 | 30 |
| Diene content (percent by weight) | 17 | 0.5 |
| Existent gum (mg./100 ml.) | 1 | 2 |
| Potential gum (mg./100 ml.) | 2,310 | 2 |
| Induction time (minutes) | 62 | >240 |
| Color | (1) | (2) |
| Odor | (3) | (4) |
| RON unleaded | 95.3 | 95.0 |
| RON +0.04% TEL | 98.0 | 98.1 |
| Benzene (percent by weight) | 24.2 | 24.3 |
| Toluene (percent by weight) | 17.6 | 17.4 |

1 Deep yellow. 2 Colorless. 3 Unpleasant. 4 Agreeably aromatic.

(b) If the lithium spinel used as catalyst support in Example 3 is replaced by aluminium oxide with an intrinsic surface of 30 m.$^2$/g. and a mean pore size of 670 A. and if in the other respects the same starting material and the same reaction conditions are used as in Example 3a, the following results were obtained:

Hydrogenation product, average value from 420 operating hrs.

| | |
|---|---|
| Density at 20° C. | 0.769 |
| Bromine number (g./100 g.) | 42 |
| Diene content (percent by weight) | 1.0 |
| Existent gum (mg./10 ml.) | 6 |
| Potential gum (mg./100 ml.) | 4 |
| Induction period (minutes) | 240 |
| Color, pale yellow | |
| Odor, aromatic | |
| RON (unleaded) | 95.1 |
| RON +0.04 vol. percent TEL | 98.2 |
| Benzene (percent by weight) | 24.1 |
| Toluene (percent by weight) | 17.7 |

The hydrogenation product obtained with aluminium oxide as support is thus less satisfactory as regards the decrease of the bromine number and the diene content and has a higher gum content. In addition, when using this catalyst, the experiment had to be broken off after 420 hours, since the reduction in the catalyst activity was already so marked that the tests of the hydrogenation product no longer met the specifications. With the spinel catalyst, on the contary (Example 3a), the tests were still completely satisfactory, even after 1000 operating hours.

Example 4

For the preparation of the catalyst, a saturated solution of zinc nitrate was added in those quantities which correspond to the formation of a zinc-aluminium spinel with a stoichiometric composition to aluminium oxide powder with an intrinsic surface of 300 m.²/g. The mass obtained was dried and heated to 500° C., the nitrate being decomposed into oxide. The cooled mass was shaped with addition of 2% by weight of zinc stearate into 4 mm. pellets and was then heated for 8 hours at 1050° C. The product obtained was zinc-aluminium spinel, according to the X-ray structure photograph. It had an intrinsic surface of 25 m.²/g. and a mean pore size of 740 A. The preparation of the noble metal catalyst and the hydrogenation reaction carried out therewith took place in the manner described in Example 1.

A comparison of the initial cracked gasoline and the hydrogenation product is shown in the following table:

|  | Cracked gasoline introduced | Hydrogenation product, average value from 820 operating hours |
|---|---|---|
| Density at 20° C | 0.780 | 0.774 |
| Bromine number (g./100 g.) | 67 | 39 |
| Diene content (percent by weight) | 16 | 0.6 |
| Existent gum (mg./100 ml.) | 2 | 2 |
| Potential gum (mg./100 ml.) | 2,170 | 2 |
| Induction period (minutes) | 69 | >240 |
| Color | (¹) | (²) |
| Odor | (³) | (⁴) |
| RON unleaded | 96.2 | 95.6 |
| RON +0.04% TEL | 98.3 | 98.3 |
| Benzene (percent by weight) | 26.1 | 26.0 |
| Toluene (percent by weight) | 18.2 | 18.3 |

¹ Deep yellow  ² Colorless.  ³ Unpleasant.  ⁴ Agreeably aromatic.

Example 5

The catalyst described in Example 3a was used for the selective hydrogenation of the diolefines in a benzene/toluene fraction (BT fraction) of a pyrolysis gasoline in the reaction described in Example 1. The hydrogenation conditions were the same as in Example 1.

A comparison of the properties of the BT fraction introduced and of the hydrogenation product obtained is shown in the following table:

|  | BT fraction introduced | Hydrogenation product, average value from 700 operating hours |
|---|---|---|
| Bromine number (g./100 g.) | 34 | 17 |
| Diene content (percent by weight) | 8.8 | 0.2 |
| Existent gum (mg./100 ml.) | 1 | 1 |
| Benzene (percent by weight) | 39.0 | 38.7 |
| Toluene (percent by weight) | 32.3 | 32.1 |

The hydrogenation product obtained can be hydrogenated without any formation of polymers at relatively high temperatures to form monoolefine-free products.

What we claim is:

1. A process for the selective hydrogenation of pyrolysis gasoline or fractions thereof which comprises effecting the hydrogenation at temperatures below about 100° C. in the presence of a catalyst which is a platinum group noble metal on a support comprising an aluminium spinel, which spinel is at least one metal selected from the group consisting of lithium, and magnesium, wherein the support has an intrinsic surface of 10 to 120 m.²/g. and a mean pore size of 200 to 800 A., and wherein said noble metal catalyst comprises 0.01 to 5 wt. percent noble metal.

2. A process as claimed in claim 1 wherein said noble metal comprises 0.01 to 2 wt. percent.

3. A process as claimed in claim 1 wherein said noble metal is palladium.

4. A process as claimed in claim 1 wherein said support is substantially wholly an aluminium spinel.

5. A process as claimed in claim 1 wherein said spinel is of lithium.

6. A process as claimed in claim 1 wherein said hydrogenation is carried out at a temperature of about 20 to 27° C. and in the presence of a hydrogenating gas containing at least about 50 volume percent hydrogen.

7. A process as claimed in claim 1 including recycling about 0.2 to 2 parts by weight of hydrogenated pyrolysis gasoline per part of fresh feed pyrolysis gasoline.

References Cited

UNITED STATES PATENTS

| 2,728,713 | 12/1955 | Kearby et al. | 252—466 |
| 2,799,627 | 7/1957 | Haensel | 208—96 |
| 2,814,599 | 11/1957 | Lefrancois et al. | 252—466 |
| 2,914,464 | 11/1959 | Burton et al. | 208—138 |
| 2,974,111 | 3/1961 | Nixon | 252—463 |
| 3,182,015 | 5/1965 | Kronig et al. | 208—143 |
| 3,239,453 | 3/1966 | Halik et al. | 208—143 |
| 2,982,793 | 5/1961 | Turner et al. | 208—143 |
| 2,511,453 | 6/1950 | Barry | 260—677 |

HERBERT LEVINE, Primary Examiner

U.S. Cl. X.R.

252—466; 260—677

PO-1050
(5/69)

UNITED STATES PATENT OFFICE
CERTIFICATE OF CORRECTION

Patent No. 3,459,657  Dated August 5, 1969

Inventor(s) Walter Kroenig, et al

It is certified that error appears in the above-identified patent and that said Letters Patent are hereby corrected as shown below:

Column 4, line 1 (Specification page 6, line 28) after "genation" - "product accumulating in a separator beneath the" should read: --reaction was carried out in the same way. The--

Column 4, line 67 (Specification page 8, line 25) "Existent gum (mg/10 ml.)" should read --Existent gum (mg/100 ml.)--

SIGNED AND
SEALED
MAY 5 1970

(SEAL)
Attest:

Edward M. Fletcher, Jr.
Attesting Officer

WILLIAM E. SCHUYLER, JR.
Commissioner of Patents